United States Patent
Earl (10) Patent No.: US 8,210,431 B2
(45) Date of Patent: *Jul. 3, 2012

(54) VOTING DEVICE INCLUDING DYNAMIC KEYPAD AND GESTURE VOTING

(75) Inventor: Jeffrey Earl, East Sussex (GB)

(73) Assignee: Albert Hall Meetings, Ltd. (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,031

(22) Filed: Sep. 23, 2011

(65) Prior Publication Data

US 2012/0013489 A1 Jan. 19, 2012

Related U.S. Application Data

(63) Continuation of application No. 12/576,015, filed on Oct. 8, 2009, now Pat. No. 8,047,436.

(51) Int. Cl.
*G06K 17/00* (2006.01)
(52) U.S. Cl. .......................... 235/386; 235/51
(58) Field of Classification Search .................. 235/386, 235/51, 50 R, 50 A, 50 B, 54 F, 454
See application file for complete search history.

(56) References Cited

U.S. PATENT DOCUMENTS

| | | | |
|---|---|---|---|
| 4,377,870 A | 3/1983 | Anderson et al. | |
| 4,930,011 A | 5/1990 | Kiewit | |
| 5,226,177 A | 7/1993 | Nickerson | |
| 5,465,384 A | 11/1995 | Bejan et al. | |
| RE35,449 E | 2/1997 | Derks | |
| 6,011,578 A | 1/2000 | Shatto et al. | |
| 6,885,304 B2 | 4/2005 | Cliff et al. | |
| 6,888,457 B2 | 5/2005 | Wilkinson et al. | |
| 8,047,436 B2 * | 11/2011 | Earl | 235/386 |
| 2003/0044021 A1 | 3/2003 | Wilkinson et al. | |
| 2006/0020427 A1 | 1/2006 | Kahn et al. | |
| 2006/0072497 A1 | 4/2006 | Buehler et al. | |
| 2007/0222746 A1 | 9/2007 | LeVine | |
| 2007/0283379 A1 | 12/2007 | Earl | |
| 2008/0311943 A1 | 12/2008 | Earl | |

FOREIGN PATENT DOCUMENTS

WO 2008152503 A2 12/2008

OTHER PUBLICATIONS

European Search Report; Application No. EP 10 18 6957; Issued: Nov. 15, 2011; Mailing Date: Nov. 28, 2011; 9 pages.

* cited by examiner

*Primary Examiner* — Karl D Frech
(74) *Attorney, Agent, or Firm* — St. Onge Steward Johnston & Reens LLC (57) ABSTRACT

A voting device and system for voting is described having a touch sensitive membrane input surface including at least one of an arc input and a slider input, at least one sensor for detecting movement and orientation of the voting device, and at least one transmitter. The voting device receives a voting response inputted by a user from at least one of the arc input, the slider input and the sensor, and then sends the user inputted response upon at least one of a pressure and a release of pressure on the touch sensitive membrane input surface.

34 Claims, 5 Drawing Sheets

VOTING DEVICE INCLUDING DYNAMIC KEYPAD AND GESTURE VOTING

CROSS-REFERENCE TO RELATED APPLICATIONS

This application is a continuation of U.S. patent application Ser. No. 12/576,015, filed Oct. 8, 2009 now U.S. Pat. No. 8,047,436, which application is hereby incorporated by reference herein in its entirety.

FIELD OF THE INVENTION

This invention relates to an audience response and communication device and, in particular, to a voting device including a dynamic keypad and/or a sensor for detecting movement and orientation of the voting device.

BACKGROUND OF THE INVENTION

Audience response systems allow large groups of people, such as meeting participants or audience members, to vote on a topic or respond to simple questions posed by an instructor or presenter. Various audience response systems are known and used in numerous applications such as education, audience participation, game shows, voting at conferences and the like, and opinion polls.

A typical audience response system comprises one or more base station transceivers that are connected to a computer including audience response system software, and a number of keypads that incorporate a simple keypad and display. The base station transmits data representing a question to the keypads and each member of the audience enters their response to the question on their keypad (e.g., yes/no or numeric) and the responses are communicated to the base station. The responses may then be stored, tallied, and/or displayed using the audience response system software. The keypad units typically include some type of user's interface, such as a keypad for inputting a user's response, and a display for displaying the response. However, these known audience response systems have many limitations. For example, such systems only provide for a simple Yes/No answer to a specific question, and thus do not allow a user to respond with a degree of opinion. Additionally, a user's response is usually entered via a keyboard, which can be inconvenient, for example where the user needs to continuously engage with a speaker or main screen instead of looking down at the keypad to find a correct answer.

There are several prior art systems which attempt to address the above-mentioned shortcomings. One of such systems is described in U.S. Pat. No. 6,888,457 to Wilkinson et al., which disclose a portable apparatus for monitoring a reaction of a user to a performance. The apparatus includes various types of sensors, such as a temperature sensor, a perspiration sensor, a pulse rate sensor or an accelerometer, for detecting the user's reaction to the performance. However, the sensors are incapable of measuring direct user responses or votes. For example, the device of Wilkinson et al. does not provide a feature that allows the user to move the device in a particular way in order to provide a positive or negative response to a specific question. Additionally, the device of Wilkinson et al. does not include an improved user interface, for example a membrane that is touch-sensitive, to provide a simpler and more convenient way of entering the user's response.

U.S. Pat. No. 6,011,578 to Shatto et al. discloses another system for collecting response data adapted for use in market research. The system includes response units having a keypad, including numerical and bi-conditional keys, and a dial including several settings, for users to provide responses to questions. Although the system of Shatto et al. offers an improved way of entering a user's response, it still suffers from several drawbacks. For example, even though it allows the user to enter several degrees of opinion, such as "very dull" to "very good", it is still limited in its available response ranges. Additionally, the response can be entered only by conventional means, such as numeric keys or the dial.

Yet another prior art system is a gestural input system disclosed in U.S. Patent Application Publication No. 2007/0222746 to LeVine. The system of LeVine includes a sensor, such as a digital camera, which is capable of generating data/signal that may be processed for tracking a movement of the device, and software that translates the movement into digital content. The device also includes a display that displays the corresponding movement of digital content, and a data input. Although this system provides a type of gestural input, it does not allow for using gestures to indicate an amount or degree of a user's response.

Accordingly, there is still a need for an improved audience response system having advanced features beyond typical yes/no question and response capabilities.

SUMMARY OF THE INVENTION

The present invention provides a novel and improved system and method for voting, which is unique in its interactivity, offering a contact membrane interface with a combination of different input metaphors for inputting various degrees of opinions/votes.

In accordance with the present invention, a voting device is provided, having a contact membrane input surface including at least one of an arc input and a slider input, at least one sensor for detecting movement and orientation of the voting device, and at least one transmitter. The voting device receives a voting response inputted by a user from at least one of the arc input, the slider input and the sensor, and sends the user inputted response upon at least one contact with the contact membrane input surface.

The contact membrane input surface may comprise at least one of a resistive membrane input surface and/or a capacitive membrane input surface.

The user response may be transmitted upon at least one of a pressure or a release of the pressure on the contact membrane input surface.

The voting device may further comprise at least one base station arranged to transmit and receive signals with the voting device. Furthermore, the voting device may comprise a central computer connected to the base station. The voting device may be connected to the base station via a wireless connection.

The user inputted response may correspond to a degree and direction of movement of the voting device measured by at least one sensor.

The voting device may further comprise a display. The display may be adapted for displaying visual data corresponding to the user inputted response. Additionally, the voting device may also comprise a plurality of keys for data entry, and at least some of the keys may include a light source.

In a different embodiment, the user response may be inputted by a combination of data entry via the plurality of keys and a movement of the device measured by at least one sensor.

In another embodiment, the user response may be inputted by a combination of data entry via the plurality of keys and at least one of the arc input and the slider input.

In yet another embodiment, the user response may be inputted by rotating the voting device 180 degrees such that the contact membrane is facing upward for a positive response and facing downward for a negative response. Additionally, the user response may be inputted by rotating the voting device 90 degrees left from its initial position for a negative answer and 90 degrees right from its initial position for a positive response. Furthermore, the user response may be inputted by holding the voting device above the user's head pointing up for a positive response and by holding the voting device by the user's side pointing down for a negative response.

The voting device may further comprise an audible signal corresponding to the user inputted response.

The voting device may also be adapted to respond within a particular time slot after receiving a signal from at least one base station. Additionally, the voting device may be adapted to transmit multiple responses in sequence after receiving a signal from at least one base station. Furthermore, the base station may record only most recent response from the voting device as a final response.

The voting device may send a first user response upon application of pressure on the contact membrane input surface and a second user response upon release of the pressure.

A system for voting, according to another aspect of the invention, includes a central computer, at least one base station connected to the central computer, and a plurality of voting devices each arranged to wirelessly transmit and receive signals with the base station. At least one of the voting devices is located remote to the base station. Each voting device has a contact membrane input surface including at least one of an arc input and a slider input, at least one sensor for detecting movement and orientation of said voting device, and at least one transmitter. Each voting device receives a user inputted voting response from at least one of the arc input, the slider input and the sensor, and transmits the user inputted response upon at least one of a pressure and a release of pressure on the contact membrane input surface.

An embodiment of a method for voting is also provided. The method includes the steps of: providing at least one voting device having a contact membrane input surface including at least one of an arc input and a slider input, and at least one sensor for detecting movement and orientation of said voting device; receiving a voting response inputted by a user via at least one of the arc, the slider and the sensor; and transmitting the user inputted response via a transmitter upon a contact with said membrane input surface.

In some embodiments, the user response may be transmitted upon at least one of a pressure or a release of the pressure on the contact membrane input surface. In certain embodiments, the contact membrane may be a resistive membrane or a capacitive membrane.

The method may further comprise the step of transmitting information from at least one base station to at least one voting device and transmitting the user inputted response from at least one voting device to at least one base station.

In another embodiment, at least one voting device may be connected to at least one base station via a wireless connection.

The user response may be inputted by moving at least one voting device and measuring a degree and direction of movement by at least one sensor. In some embodiments, the user may input the user response by rotating the voting device 180 degrees such that the contact membrane is facing upward for a positive response and facing downward for a negative response. In other embodiments, the user may input the user response by rotating the voting device 90 degrees left from its initial position for a negative answer and 90 degrees right from its initial position for a positive response. In yet other embodiments, the user may input the user response by holding the voting device above the user's head pointing up for a positive response and by holding the voting device by the user's side pointing down for a negative response.

The method for voting may further comprise the step of displaying visual data corresponding to the user inputted response on a display provided on at least one voting device.

Additionally, the method may comprise the step of inputting the user response via a plurality of keys. Furthermore, the method may comprise the step of providing an audible signal corresponding to the user inputted response.

In other embodiment, at least one base station may send a signal to at least one voting device indicating that a vote is open, and then at least one voting device may transmit the user inputted response back to at least one base station within a particular time slot after receiving the signal. Additionally, at least one base station may transmit a signal to at least one voting device indicating that a vote is open, and at least one voting device may then transmit multiple responses in sequence providing for continuous monitoring of the user's reaction. Furthermore, at least one base station may record only most recent response from at least one voting device as a final user response.

The method may further comprise the step of transmitting a first user response via the transmitter upon application of pressure on the contact membrane input surface and transmitting a second user response via the transmitter upon release of the pressure.

These and other objects, advantages and features of this invention will become apparent upon review of the following specification in conjunction with the drawings.

DETAILED DESCRIPTION OF THE INVENTION

Described herein is a voting device and system for voting having a dynamic keypad with a contact membrane and a sensor for detecting movement and orientation of the voting device, which has significant advantages over the audience response systems known in the art. A user can input a response by entering a value via an arc or by moving a slider from side to side. The inputted value increments are displayed on a display and may be automatically transmitted to a central processing unit as the user's finger leaves the fascia. Another novel input feature includes "gesturing," which implements different user's gestures, such as "hands-up/hands-down," as the user's response. A movement sensor device, such as accelerometer, is used to measure percentage of movement of the voting device by the user to indicate the degree of positive or negative user's response. The voting device may also combine the "gesture" voting with a button selection. For instance, the user may employ a minus or a plus button and the amount by which the user moves the device will indicate the degree of user's for or against vote.

Figure 1:
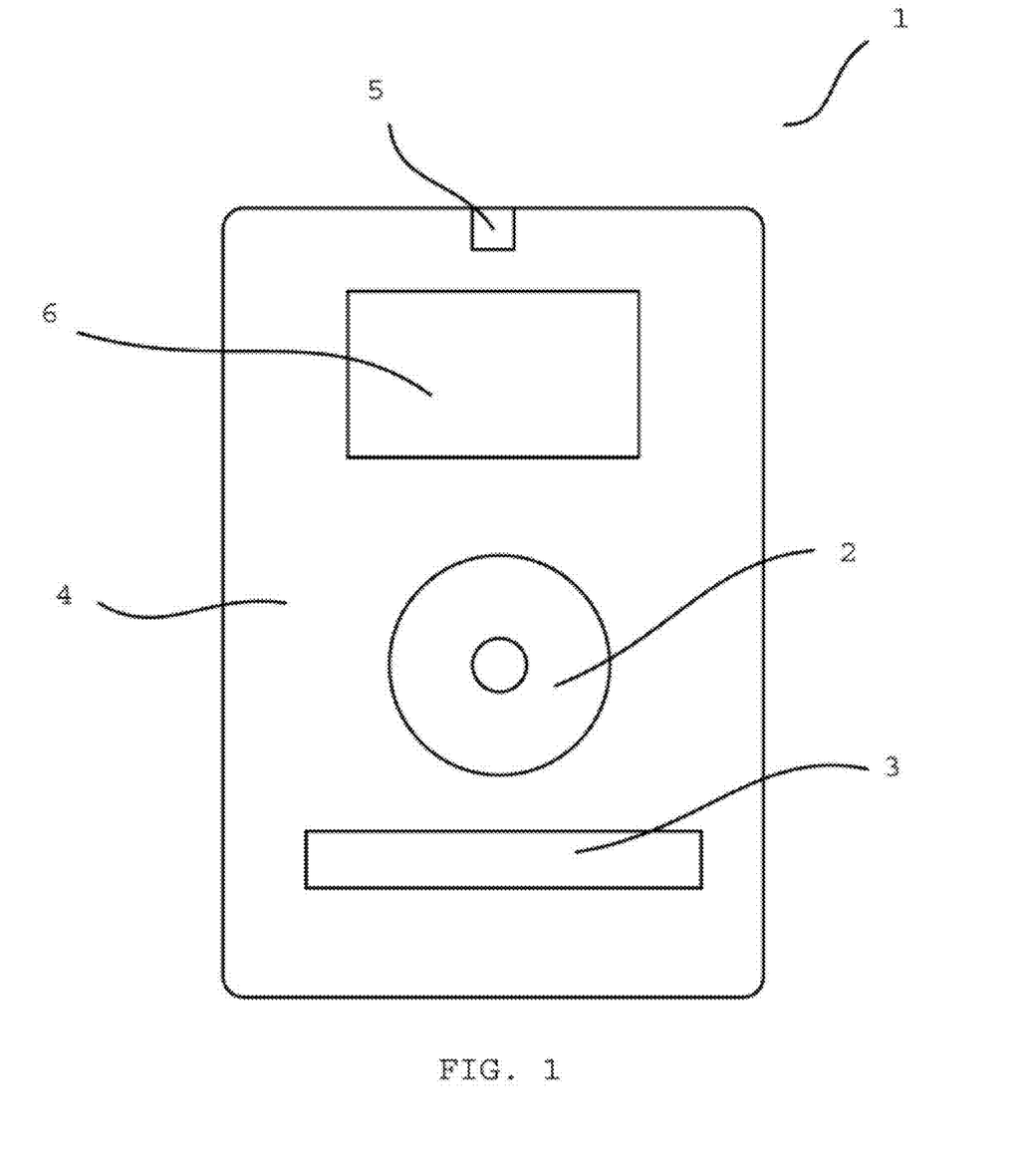
FIG. 1 illustrates a voting device according to an exemplary embodiment of the present invention.

FIG. 1 shows one exemplary voting device 1 according to the present invention. The device 1 is preferably compact in size, such as the size of a credit card. For example, the device 1 may be a credit card sized touch sensitive dynamic device. The device 1 includes a power source (not shown). In the exemplary embodiment, the power source includes primary (disposable) cells or rechargeable technology. The device also includes at least one transceiver, such as a radio transceiver, a processor, and memory. In one exemplary embodiment, the voting device includes a combination transceiver/processor/memory device.

The device 1 includes a contact membrane 4 having at least one of an arc input 2 and a slider input 3. In one exemplary embodiment, the contact membrane includes a scroll arc and a slider as input mechanisms. The contact membrane may be any touch sensitive membrane, e.g. a resistive membrane or a capacitive membrane. The device 1 further includes at least one sensor 5 for detecting movement and orientation of the voting device. The voting device 1 receives a voting response inputted by a user from at least one of the arc input 2, the slider input 3 and the sensor 5, and then sends the user inputted response upon at least one of a pressure and a release of pressure on the contact membrane 4 input surface.

The voting device 1 also includes a display 6 (e.g., an organic light emitting diode, "OLED" display, LCD or any future display technology), which displays visual data corresponding to voting parameters and the user inputted response. The display 6 delivers feedback to the user indicative of a degree of the user's response. Various alternative display modes for representing the user's response may be utilized. For example, the display 6 may illustrate a volume escalator, wherein as the voting response becomes more positive, the escalator "blocks" would go solid and fill in, and as the vote becomes more negative, blocks would become transparent and the volume would empty down. Another possible display arrangement may illustrate a ball that runs left of the center along a tightrope to indicate a negative response, and the ball rolling right would indicate a positive response. Yet another possible display illustration of the vote progress may be a strength indicator similar to that of antenna signal strength. It should be understood that other suitable display layouts may be utilized without departing from the spirit of the present invention.

The dynamic display may cover the entire fascia of the voting device 1 and serve as both a dynamic keypad and a display/feedback area. Alternatively, the display may cover only a portion of the fascia and serve exclusively to display the feedback to the user indicative of a degree of the user's response.

In one exemplary embodiment, the voting device 1 operates as follows. As a vote starts, the display 6 lights up, with a user definable message such as "vote now", and the contact membrane 4 will illuminate the input device chosen for the particular vote. For instance, if the scale is 1 to 10, then the question designer will have the choice of selecting the arc input 2 or the slider input 3 as their input device and that device will become active when chosen by the user. In alternative, the system may employ a "secret until lit" feature, wherein the device user will not know which input device is available for a particular voting session until that device is illuminated. Any suitable lightning means may be used to illuminate the input devices, such as light emitting diodes (LED's), electroluminescent pads and guided light sources such as LED's and light pipes or transparent layers. Illumination may be single color or a color combination either produced through filters or different colored emitting devices. LED's may be positioned around the periphery of the arc input 2 or the slider input 3, or may have any other suitable configuration.

When pressure is applied to either the arc input 2 or the slider input 3, the display 6 immediately responds and displays the number at the position on the scale relative to the point of contact. For instance, if the user touches the slider input 3 at the 50/50 mark, and the scale chosen for this particular voting session is 1 to 10, then the display 6 will display a degree of vote that correspond to 5. If the user slides his/her finger left, or counterclockwise, the degree of vote will decrease, and if the user slides it right, or clockwise, the vote will increase accordingly. It should be noted that the direction of movement and the respective value of the user's response may be reversed, meaning that the movement of the user's finger to the left, or counterclockwise, may represent the positive response, and the movement to the right, or clockwise, may represent the negative response. LED's positioned around the periphery of each user input device will illuminate as the user slides or scrolls the finger across, corresponding to the degree of the response.

The voting device 1 may utilize various scales for measuring a degree of user's response. For example, the device 1 can implement an 11-point scale, wherein a zero value is assigned to a neutral position of the slider input 3 or the arc input 2, and then, as the user slides the finger left or counterclockwise, the value decreases from −1 to −5, and as the user slides the finger right or clockwise, the value increases from +1 to +5. Alternatively, a 100 point scale may be used, with the furthest left position having a zero value, and the furthest right position being 100, wherein the value decreases or increases in increments of 1 as the finger is slid across each input device. Yet another type of scale may be a 100 point split scale, with the center or neutral position being a zero, with decreasing values from −10% through −50%, and increasing values from +10% through +50%. Of course, many other possible value scales may be used in accordance with the present invention, depending on requirements of a particular voting session. Additionally, it may be possible to combine various scales in one voting device 1, with a capability of switching between the scales.

The voting device 1 may transmit votes and/or data in various ways. First, the user's input or vote may be sent to the base station 9 upon release of the user's finger from the arc input 2 or the slider input 3. Alternatively, the voting device 1 may send a first user response upon application of pressure on the contact membrane input surface 4 and a second user response upon release of the pressure from the contact membrane surface 4. Second, the user may be required to press a "send" button or key on the contact membrane 4 after the release of the pressure upon the arc input or the slider input. Finally, the user's input may be transmitted to the base station 9 continuously as either the arc input 2 or the slider input 3 is coursed left to right or right to left, so that feelings can be measured from audiences in real time as they are watching a TV advertisement or movie trailer, such as in market research panels.

An alternative embodiment of the voting device may also utilize a memory device (e.g., dataflash module) that collects and stores users' responses off-line, for example the responses inputted during lunchtime or when the users leave a voting room for a period of time. Once the user returns to the voting room, the response that was previously collected and stored on the memory device will be automatically transmitted to the base station. This allows the voting device to operate beyond the "live" voting sessions, thereby increasing opportunities to gather users' input and delivering added value outcomes.

In some exemplary embodiments, the voting device 1 of the present application has the ability to input direct user responses by moving the voting device. For example, the voting device 1 may incorporate a sensor 5 for detecting the movement and orientation of the voting device 1 and a transmitter (not shown) for transmitting the user inputted response. An accelerometer or any other suitable motion sensor device may be used in accordance with the present invention. The user inputted response corresponds to a degree and direction of movement of the voting device 1 measured by the sensor 5.

The following gesture voting styles may be used with the voting device of the present application. First, the voting device 1 may be rotated 180 degrees, wherein the contact membrane surface 4 is facing up for a positive answer and facing down for a negative answer. In order to protect anonymity of voting, it might be preferable if the contact membrane 4 is facing up as a starting position, and if the user then turns it towards himself/herself and face down for the negative answer, and away from himself/herself and face down for the positive answer.

An alternative style of voting that may be implemented is where the user uses a wrist action of up to 90 degrees left as the direction of the negative response and 90 degrees right as the direction of the positive response. The center position of the voting device will correspond to a zero on the voting scale, the left position will correspond to a maximum negative degree of vote, such as −5 or −10, and the right position will correspond to a maximum positive degree, such as 5 or 10.

Other alternative styles of voting may include "hands-up/hands-down" concept, wherein the voting device 1 is held above the user's head pointing up for a positive response versus being held by the user's side pointing down for the negative response, or flipping the device over south or north for the positive or negative response respectively. Similarly, many other styles of "gesture" voting may be utilized in accordance with the present invention. Regardless of the particular voting style, the movement sensor 5 is used to detect and measure percentage of rotation or movement of the device 1 to indicate a degree by which the user is against or for a particular voting choice. Additionally, the device 1 may implement a "motion scrolling," wherein the user may move the device 1 in a particular direction in order to scroll a list displayed on the display up/down or left/right.

Each of the voting styles may be accompanied by an audible scales tune to deliver feedback to the user. Left may be a sound similar to going down the musical scale and right may be climbing up the scales. Other sound effects that can be elected when creating the specific vote via the PC application could mimic negative and positive sounds as popularized by TV game shows. Preferably, sounds are capable of being enabled or disabled depending on each user's preference.

Figure 2:
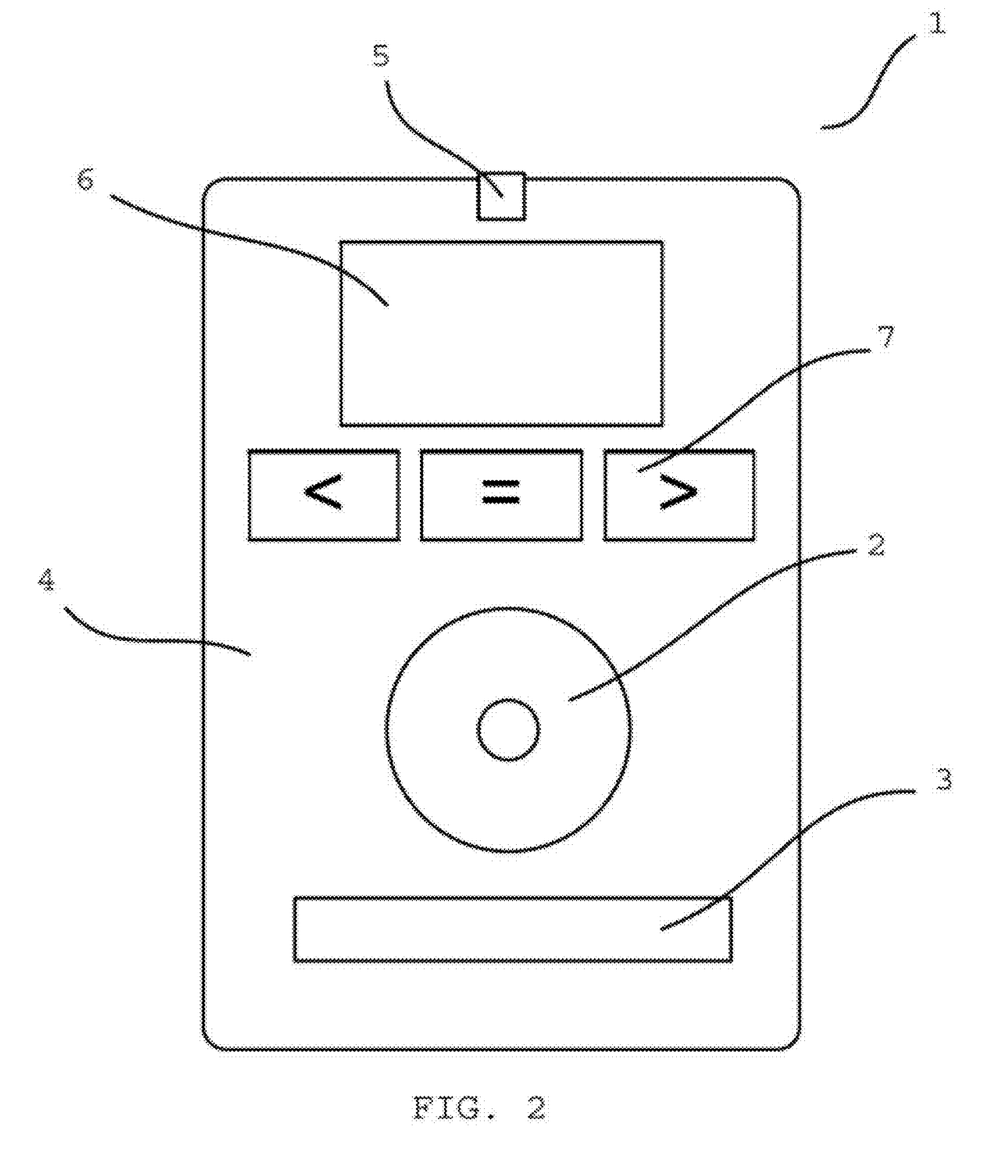
FIG. 2 illustrates another exemplary embodiment of the voting device shown in FIG. 1.

FIG. 2 illustrates another exemplary embodiment of the voting device 1 of the present invention. In addition to the arc input 2 and the slider input 3, the contact membrane 4 also includes three buttons 7. The three buttons may be assigned different values, for example, the left button may correspond to "<" sign, the middle button may correspond to "=" sign, and the right button may correspond to ">" sign. The buttons 7 may further be illuminated by LED's or any other suitable lighting means. The buttons 7 may be utilized alone or in combination with other input devices. For example, the user may vote by pressing the left "<" button to indicate a negative response or the right ">" button to indicate a positive response. Or, the user may employ the "gesture" voting together with the buttons 7, wherein pressing the left or right button and moving the voting device 1 will indicate the negative or positive response respectively, with a degree of the response being measured by the motion sensor 5. The user may also press one of the buttons 7, e.g., to indicate a positive or negative response, then use the slider or arc to indicate a degree of the response.

Figure 3:
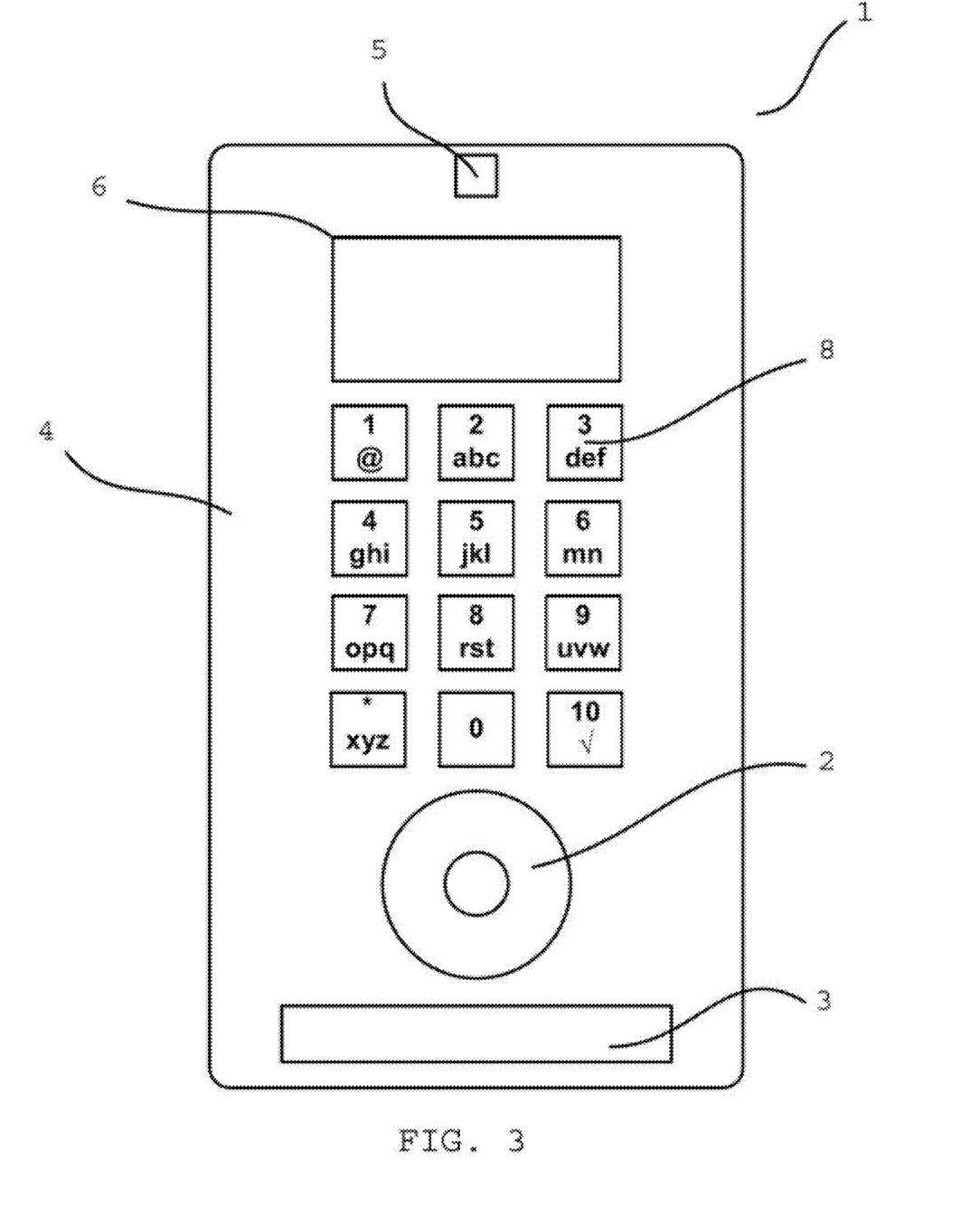
FIG. 3 illustrates yet another exemplary embodiment of the voting device shown in FIG. 1.

FIG. 3 shows yet another exemplary embodiment of the voting device 1 layout. In this embodiment, the voting device 1 further includes a plurality of buttons 8. The buttons 8 may have numerical or alphabetical values, or both. The plurality of buttons 8 may be used by the user for data entry, and at least some of the keys may include a light source, such as LED's. It should be noted that the layout of the voting device 1 shown in FIG. 3 is an exemplary embodiment only, and that other layouts may be used in accordance with the present invention. For example, the arc input 2 and/or the slider input 3 may be positioned above the plurality of buttons 8, or may be centered, with the plurality of buttons positioned around it. Additionally, the numerical and/or alphabetical values assigned to each of the plurality of buttons may be different depending upon the user's preference. Furthermore, the sensor 5 may be positioned in other locations on the voting device 1, e.g. on the side of the display 6.

The user response may be inputted by a combination of data entry via the plurality of buttons 8 and at least one of the arc input 2 and the slider input 3. The user input may also be entered by a combination of data entry via the plurality of buttons 8 and by a movement of the voting device 1 measured by the sensor 5.

Figure 4:
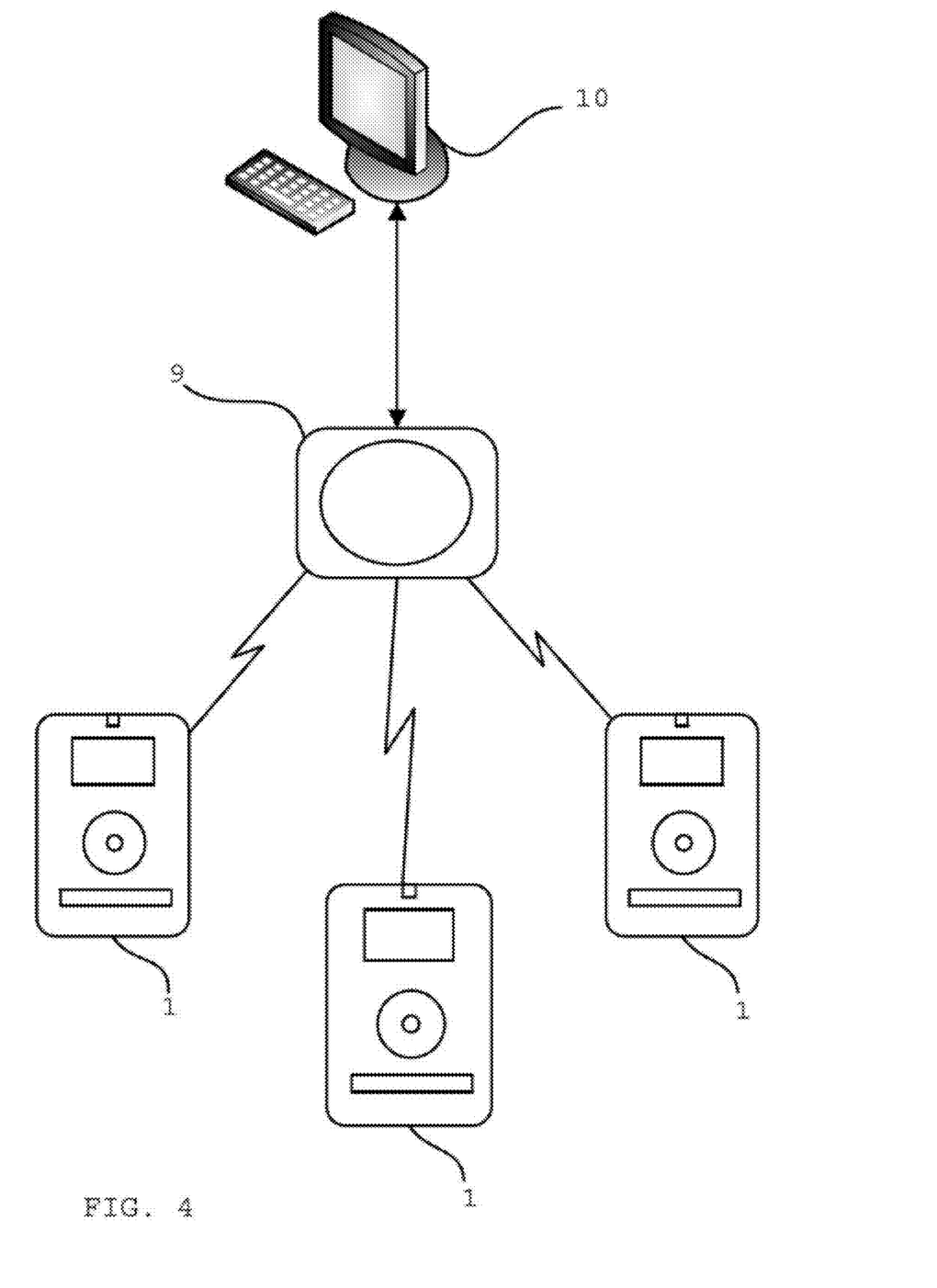
FIG. 4 illustrates a system for voting utilizing the voting device according to the present invention.

FIG. 4 illustrates a system for voting in accordance with the present invention that implements the voting device 1 as described above. Some aspects of the voting system described herein are described in more detail in commonly owned co-pending U.S. Patent Publication No. 2007/0283379 and U.S. Patent Publication No. 2008/0311943. As such, the disclosures of U.S. Patent Publication No. 2007/0283379 (application Ser. No. 11/831,582) and U.S. Patent Publication No. 2008/0311943 (application Ser. No. 12/139,824) are incorporated herein by reference in their entirety.

The voting system includes at least one base station 9 for transmitting and receiving signals with a plurality of voting devices 1. The voting system further includes a central computer 10 that it connected to the base station 9. The base station 9 includes at least one radio frequency (RF) transceiver, such as a radio frequency (RF) transceiver, and at least one processor. The base station 9 is in communication with the central computer 10 via a wired or wireless connection. For example, the base station 9 and central computer 10 may connect via a USB connection or an Ethernet connection or network. The base station 9 may also include two or more radios (e.g., RF transceivers) and two or more antennas. Each of the voting devices 1 may communicate with the base station 9 via a wired connection or wirelessly via one or more radio frequency channels. For example, each voting device may include at least one RF transceiver.

The voting devices are generally in the proximity of the base station, e.g., in a conference room or hall. In a preferred embodiment, the voting devices have a range of at least 150 meters. In some embodiments at least one of the voting devices is located remote to the base station as described in commonly owned co-pending U.S. Patent Publication No. 2008/0311943. Each voting device has a contact membrane input surface including at least one of an arc input and a slider input, at least one sensor for detecting movement and orientation of said voting device, and at least one transmitter. Each voting device receives a user inputted voting response from at least one of the arc input, the slider input and the sensor, and transmits the user inputted response upon at least one of a pressure and a release of pressure on the contact membrane input surface.

The voting device 1 may support both standard voting whereby the vote is opened by the base station 9 and the voting devices 1 respond in their timeslot when the user selects a value to send. The second mode is "moment to moment" where the base station 9 sends a configuration message to each of the voting devices 1 indicating that this is an "open" vote and that it will be monitoring any changes to the voting position thus delivering a "pseudo real-time" vote stream which may be used to monitor audience reaction to what the audiences are experiencing. The voting devices 1 of the present invention may listen for configuration messages continuously or at intervals. For example, a voting device 1 may listen for at least 300 ms every 10 seconds for a radio message from the base station and more frequently when told to by a radio message from the base station.

The display 6 should indicate successful voting and then return to a wait mode, allowing the users to change their mind if they desire and vote again. The base station 9 will only record the most recent vote from each voting device 1 as their final opinion.

Figure 5:
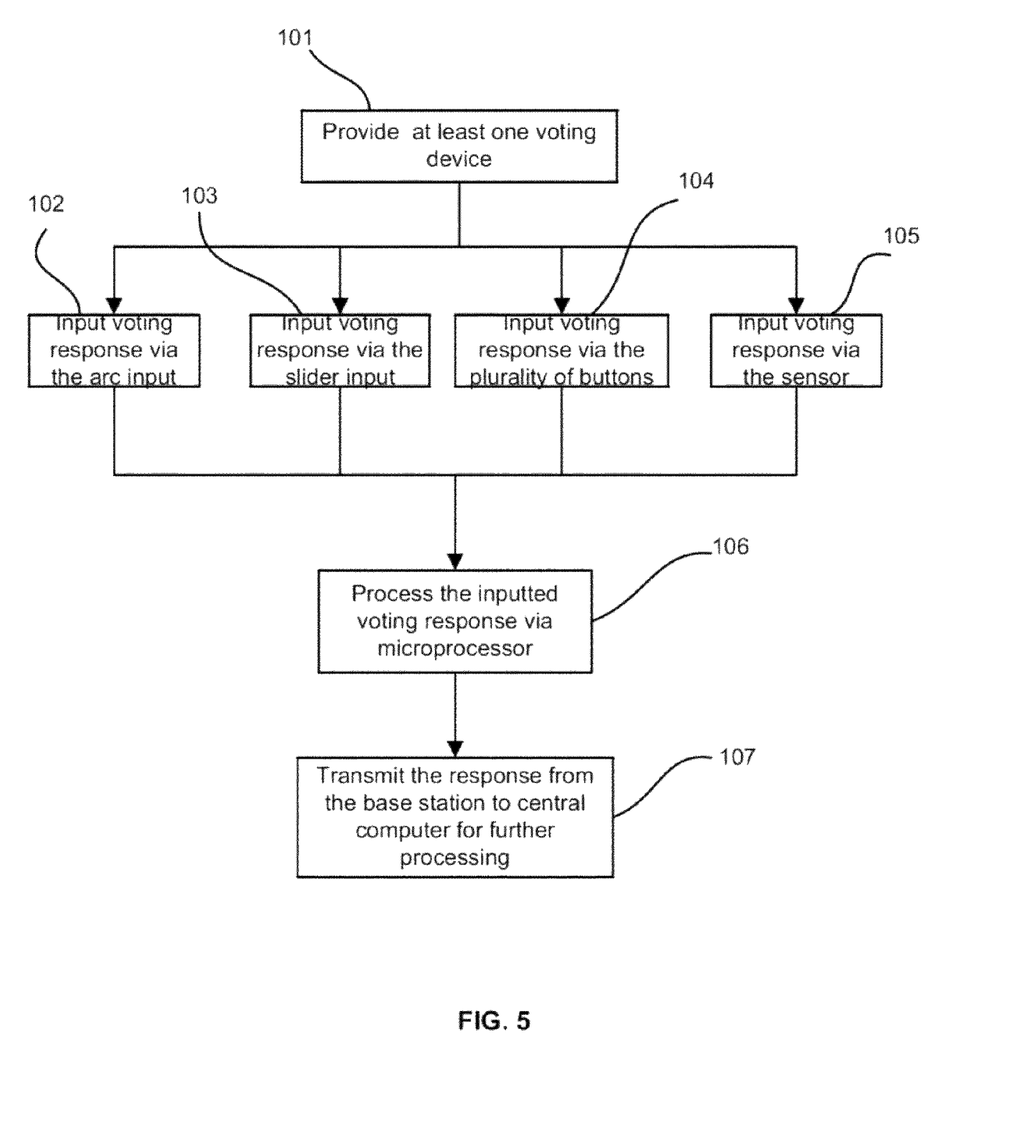
FIG. 5 illustrates a method of receiving and transmitting user inputted responses employable by the voting device in accordance with the present invention.

FIG. 5 illustrates a method of receiving and transmitting user inputted responses employable by the voting device 1 in accordance with the present invention. The exemplary method illustrates a function of the voting system that allows users to utilize various user input devices, alone or in combination, for a unique and more convenient voting experience. The method includes a first step of providing at least one voting device having a contact membrane input surface including at least one of an arc input and a slider input, and at least one sensor for detecting movement and orientation of the voting device (step 101). As described above, the contact membrane may be, for example, a resistive membrane or a capacitive membrane. The voting device may further include a plurality of buttons having numerical or alphabetical values, or both. The voting device receives a voting response inputted by a user via at least one of the arc (step 102), the slider (step 103), the plurality of buttons (step 104), or the sensor (step 105). Then, the inputted voting response is processed via microprocessor (step 106) and transmitted via a transmitter (e.g., RF transceiver) of the voting device to a base station upon making a contact with the contact membrane input, e.g. applying pressure or releasing pressure on the membrane input surface. If desired, the voting device may also transmit a first user response via the transmitter upon a first contact with the contact membrane input surface and then transmit a second user response via the transmitter upon a second contact with the membrane input surface. The voting device may be connected to the base station via a wired connection or wireless connection. The method may further comprise a step of transmitting the user inputted response from the base station to a central computer connected to the base station for processing (step 107). In some embodiments, responses from a plurality of users are tallied and displayed (e.g., to the audience of users) on the central computer or a monitor.

As described above, the user response may be inputted by moving the voting device and measuring a degree and direction of movement by the sensor located on the device, such as an accelerometer. Thus, the user may input the voting response by rotating the voting device 180 degrees such that the contact membrane is facing upward for a positive response and facing downward for a negative response, or by rotating the voting device 90 degrees left from its initial position for a negative answer and 90 degrees right from its initial position for a positive response, or by holding the voting device above the user's head pointing up for a positive response and by holding the voting device by the user's side pointing down for a negative response.

Additionally, the user may be able to input the voting response by utilizing the plurality of keys in combination with other input devices, namely slider, arc and/or motion sensor. This feature provides more user flexibility, allowing each user to choose the input device according to their preference. In order to provide a feedback to the user, the method may include the step of providing an audible signal corresponding to the user inputted response, and the step of displaying visual data corresponding to the user inputted response on a display provided on the voting device.

The voting device of the present invention may also be used in connection with a detector device in order to aid in discovery of individual voting devices that may have been misplaced under seats or newspapers in a meeting room. Additionally, a guard device may be used to protect against theft of the voting devices. Both the detector and guard devices may utilize an alarm state in each voting device, which would respond by beeping to enable discovery and safe return of the device.

It should be noted that, although the present invention is described with reference to audience response systems, the same system may be utilized in other applications, such as corporate gaming events that would use the "gesturing" to allow teams in the audience to control the object being displayed on the projected screen. In addition, the device of the present invention may be used for various market research programs in order to monitor and measure reaction of the audience as they are watching an advertisement trailer, a movie clip, etc. Furthermore, the present invention may be utilized in connection with objects that require movement monitoring and reporting or for orientation applications.

Although the invention has been described with reference to a particular arrangement of parts, features and the like, these are not intended to exhaust all possible arrangements or features, and indeed many modifications and variations will be ascertainable to those of skill in the art. Furthermore, the application of the present invention is not limited to voting or corporate gaming, but may also be deployed to monitor orientation and report movement of products or devices but not limited to the scope of these.

What is claimed is:

1. A voting response system, comprising:
   a device having an input surface comprising a slider input or arc input, a receiver, and a transmitter;
   a base station having a transmitter and a receiver, the base station in communication with the device; and
   a central computer in communication with the base station;
   wherein the device receives a signal from the base station relating to a vote or a presentation;
   wherein the device receives a user input responsive to the received signal; and
     wherein the device sends a responsive signal to the base station using the user input.

2. The system according to claim 1, wherein the responsive signal is indicative of a user vote, and wherein the base station continuously monitors the device for changes to the user vote.

3. The system according to claim 2, wherein the device sends a second responsive signal indicative of a change to the user vote.

4. The system according to claim 1, wherein the device receives two or more user inputs responsive to the received signal, and wherein the device sends a first responsive signal at a first time and a second responsive signal at a second time.

5. The system according to claim 1, wherein the user input is received by the input surface.

6. The system according to claim 5, wherein the device sends real-time user input to the base station.

7. The system according to claim 5, wherein the user input comprises a degree of the user input.

8. The system according to claim 1, wherein the input surface is a contact membrane.

9. The system according to claim 8, wherein the input surface is resistive or capacitive.

10. The system according to claim 8, wherein the device sends the responsive signal upon a contact with the input surface.

11. The system according to claim 10, wherein the device sends a second responsive signal upon release of the input surface.

12. The system according to claim 1, further comprising a sensor detecting movement and orientation of the device.

13. The system according to claim 12, wherein the user input is received by the sensor.

14. The system according to claim 13, wherein the device sends real-time user input to the base station.

15. The system according to claim 13, wherein the user input comprises a degree of the user input or a direction of movement of the device.

16. The system according to claim 13, wherein the user input is inputted by rotating the device or pointing the device.

17. The system according to claim 12, wherein the sensor comprises an accelerometer, gyro-meter or inclinometer, and wherein the sensor measures at least one of motion and orientation.

18. The system according to claim 1, wherein the base station and central computer comprise the same physical device.

19. The system according to claim 1, wherein the device controls the presentation.

20. The system according to claim 1, wherein the device further comprises a display.

21. The system according to claim 20, wherein the input surface and display comprise the same physical device.

22. The system according to claim 1, further comprising a light indicator.

23. The system according to claim 22, wherein the light indicator comprises an LED indicator.

24. The system according to claim 20, wherein the display displays buttons indicating system functionality.

25. The system according to claim 24, wherein the buttons are configurable.

26. The system according to claim 24, wherein the buttons comprise alphanumeric keys.

27. The system according to claim 20, wherein the display comprises an LCD screen or e-paper.

28. A method for voting, comprising the steps of:
providing a device having an input surface comprising an slider input or arc input, a receiver, and a transmitter;
providing a base station having a transmitter and a receiver, the base station in communication with the device;
providing a central computer in communication with the base station;
receiving a signal from the base station with the device relating to a poll question;
receiving with the device a user input responsive to the received signal; and
sending a responsive signal from the device to the base station using the user input.

29. The method according to claim 28, wherein the user input is received by the input surface.

30. The method according to claim 29, wherein the step of sending a responsive signal comprises sending real-time user input to the base station.

31. The method according to claim 29, wherein the user input comprises a degree of the user input.

32. The method according to claim 28, wherein the device further comprises a sensor detecting movement and orientation of the device.

33. The method according to claim 32, wherein the user input is received by the sensor.

34. The method according to claim 33, wherein the step of sending a responsive signal comprises sending real-time user input to the base station.

* * * * *